(12) United States Patent
Borgen et al.

(10) Patent No.: US 7,111,551 B2
(45) Date of Patent: Sep. 26, 2006

(54) METHOD AND SYSTEM FOR MANUFACTURING A SCREEN PRINTING FRAME HOLDING A SCREEN USING CURABLE RESIN

(76) Inventors: Bruce Arlen Borgen, 521 S. Weller St., Seattle, WA (US) 98104; Preston Riley Hopkins, 10312 86th Ave., NW., Gig Harbor, WA (US) 98333

( * ) Notice: Subject to any disclaimer, the term of this patent is extended or adjusted under 35 U.S.C. 154(b) by 59 days.

(21) Appl. No.: 10/893,448

(22) Filed: Jul. 16, 2004

(65) Prior Publication Data
US 2006/0011077 A1   Jan. 19, 2006

(51) Int. Cl.
B41F 15/34   (2006.01)
B41L 13/02   (2006.01)
B41F 15/36   (2006.01)

(52) U.S. Cl. .................. 101/127.1; 101/129; 101/128.4
(58) Field of Classification Search ...................... None
See application file for complete search history.

(56) References Cited

U.S. PATENT DOCUMENTS 5,102,605 A * 4/1992 Kagaya et al. ............... 264/257
5,443,778 A * 8/1995 Schlingman ................. 264/257
5,589,206 A * 12/1996 Hepler ........................ 425/549
2002/0059706 A1 * 5/2002 Nomura et al. .................. 26/1
2005/0166317 A1 * 8/2005 Kelly ............................ 5/110
2005/0173839 A1 * 8/2005 Crump et al. ................ 264/401

FOREIGN PATENT DOCUMENTS

DE           1955077 A  *  5/1971

\* cited by examiner

*Primary Examiner*—Daniel J. Colilla
(74) *Attorney, Agent, or Firm*—Christensen O'Connor Johnson Kindness PLLC

(57) ABSTRACT

A frame that holds a screen suitable for screen printing is manufactured using curable liquid resin. The liquid resin is received within a channel in a mold such that the resin contacts a screen positioned proximate to the channel. The liquid resin is then cured to a solid state to both secure the screen to the resin and form the frame holding the screen. Agents for curing the liquid resin may include, but are not limited to, light (such as ultraviolet light or visible light), an electron beam, and chemical curing agents. A substrate may be pressed against the screen opposite the mold to hold the screen against the mold. Furthermore, an inorganic material may be mixed with the curable liquid resin to provide a matrix that reinforces and strengthens of the screen printing frame when the resin is cured to a solid state.

25 Claims, 6 Drawing Sheets

METHOD AND SYSTEM FOR MANUFACTURING A SCREEN PRINTING FRAME HOLDING A SCREEN USING CURABLE RESIN

FIELD OF THE INVENTION

The present invention relates to screen printing, and more particularly to the manufacture of a frame that holds a screen suitable for screen printing.

BACKGROUND OF THE INVENTION

Screen printing, also known as silk screen printing, has been around for hundreds of years. It is used to place an image or deposit material on a substrate in a desired pattern or shape. Screen printing machines use a tensioned screen of fabric or mesh mounted on a supporting frame. Printing an image typically involves spreading a photosensitive film on the tensioned screen and creating a "mask" or "resist" on all the areas of the screen that are to prevent the flow of ink, dyes or other fluid media onto the substrate being printed. A squeegee then forces ink, dyes, or other fluid media through the open areas of the screen onto the substrate to form an image on the substrate.

A screen printing frame and mesh system typically consists of a rigid frame made of wood, metal, or plastic. As will be discussed below, once the frame is constructed, a fabric or mesh screen is then stretched by hand or by mechanical means over the frame, and adhered to the frame using adhesives, staples, tacks, rope pounded into grooves in the frame, or through channels and locks to the frame to secure the tensioned screen to the frame. Such frames are often referred to as "stretch and glue" frames. Screen printing frames have also been produced in which a screen is first fastened to a frame, and by rolling, telescoping, or expanding the sides of the frame, the fabric is stretched over the frame. Locking mechanisms are then used to secure the frame and screen at the desired tension.

A screen printing frame provides both a stable platform for holding a stretched screen, and a device that can be held in place during the printing process. Traditionally, there are three basic steps to create a screen frame that is ready for imaging. The first is to manufacture the frame itself. The second is to attach the screen material to the frame at a desired tension. The third is to place the emulsion or "mask" onto the screen in preparation for an image to be created on it. In the prior art, these three tasks are all separate and distinct from each other, and traditionally take place in different locations.

In the case of wooden frames, for example, to manufacture the frame requires cutting the wood to size, with four corner miters, joints, or corner connectors that are stapled, inserted, or glued to create a finished frame ready for attaching the screen. In the case of metal frames, the metal needs to be cut to the desired size, and welded, bonded, finish ground, and connected at the corners to form the finished frame. In the case of plastic frames, a heavy duty metal or high strength plastic closed mold must be made to withstand the strong injection force necessary to inject molten plastic into the mold cavity and thereby obtain the desired frame shape. These molds are very expensive to create, requiring many hours of machining in addition to the raw cost of the mold material itself. Regardless of material of construction, the frames are taken from their place of manufacture and moved to the next stage in the process, either within the facility in the case of a frame manufacturer that provides pre-stretched frames, or to a frame distributor to stretch and apply the screen for a customer. Frames may also be taken directly to the final customer who desires to stretch and apply the screen for themselves.

The process of manufacturing a frame transporting the frame as needed, and attaching a screen to the frame requires substantial handling, is burdensome, and can be expensive. What is needed is a method and system for manufacturing a screen printing frame in which the frame is manufactured and the screen adhered to the frame at the same time, thus requiring less handling and producing a screen printing frame at a much lower cost. The present invention is directed to addressing this need and other shortcomings that exist in the prior art.

SUMMARY OF THE INVENTION

Embodiments of the present invention provide a method and system that use curable liquid resin to manufacture a frame that holds a screen suitable for screen printing. In one aspect, a method of manufacturing a frame according to the invention includes providing a mold that has a channel configured to receive a curable liquid resin for forming the screen printing frame. A screen is positioned in proximity the channel in the mold. Curable liquid resin is received within the channel of the mold such that resin in the channel contacts the screen. The liquid resin is then cured to a solid state to secure the screen to the resin and form the frame holding the screen. By using curable liquid resin that contacts the screen in this manner, the manufacture of the screen printing frame and attachment of the screen to the frame is accomplished at the same time.

A wide variety of curable liquid resins may be used to manufacture a screen printing frame as described herein. For example, different liquid resins are known to be curable in the presence of light, such as ultraviolet light or visible light, or in the presence of an electron beam. Other resins are known to cure to a solid state in the presence of a chemical curing agent.

Prior to curing liquid resin received within the mold, the screen may be positioned proximate to the channel with the mold one side of the screen. Tensioning of the screen may be performed as desired prior to or after placing the liquid resin in the mold. To minimize liquid resin outside of the channel in the mold, a substrate may be pressed against the screen opposite the mold to hold the screen against the mold.

Curable liquid resin may be received within the channel of the mold in a variety of ways. For example, liquid may be poured into an open cavity mold, either by gravity or injection pressure. If desired, gravity or injection pressures may be used to cause the liquid resin to not only contact the screen but also permeate at least a portion of the screen. Vacuum pressure may also be used in some embodiments to cause the liquid resin to contact the screen and/or permeate at least a portion of the screen.

In yet another aspect, an inorganic material may be mixed with the curable liquid resin to provide a matrix that reinforces and strengthens of the screen printing frame when the liquid resin is cured. For example, such inorganic material may include glass fiber, carbon fiber, talc, silica, KEVLAR® fibers (para-aramid fibers consisting of long molecular chains produced from poly-paraphenylene terephthalamide), or a combination thereof.

The invention further provides a system for manufacturing a frame that holds a screen suitable for screen printing. The system includes a mold having a channel, such as described above, a screen positioned in proximate to the channel in the mold, a curable liquid resin, and a curing agent. The mold is configured to receive the curable liquid resin within the channel in the manner that the liquid resin contacts the screen. The curing agent, when applied to the liquid resin, causes the resin to cure to a solid state to secure the screen to the resin and form the frame that holds the screen. The system may further comprise a substrate positioned to hold the screen against the mold, which may minimize liquid resin outside of the channel in the mold when the liquid resin is received within the channel.

In embodiments where the liquid resin is curable in the presence of light, such as visible light or ultraviolet light, the mold and/or substrate may be constructed of a material through which the light can pass. The light acts as the curing agent to solidify the curable liquid resin in the mold.

In yet other embodiments, the present invention provides a mold for manufacturing a frame that holds a screen suitable for screen printing. The mold comprises a body having a channel defined therein for receiving a curable liquid resin, wherein the channel provides access for curable liquid resin to contact a screen when the screen is positioned in proximity to the mold and curable liquid resin is received within the channel. The mold is further configured to receive a curing agent that causes curable liquid resin in the channel to cure to a solid state to secure the screen to the resin and form the frame that holds the screen. The mold is constructed in such a manner to allow a curing agent, such as light, an electron beam, or a chemical, to cure the liquid resin in the channel to a solid state. In one particular embodiment, the lateral width of the channel in the mold is substantially greater than the depth of the channel. Other embodiments may be sized differently as needed for different applications.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention provides a method and system for manufacturing a frame that holds a screen suitable for screen printing, as well as a mold for manufacturing a screen printing frame, in which the construction of the frame and adherence of the screen to the frame takes place at the same time. Although various embodiments of the invention are illustrated and described below, the scope of the invention should not be interpreted as including only the precise forms disclosed, but rather may include other variations and modifications achievable by application of ordinary skill in the art.

Figure 1:
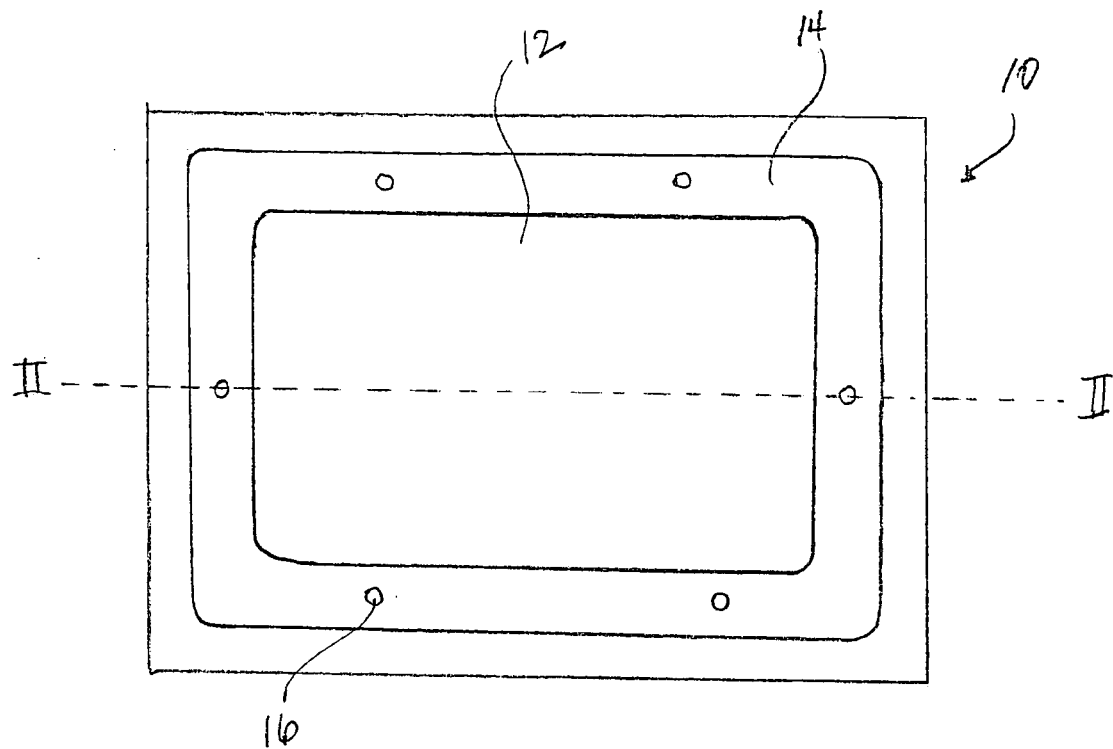
FIG. 1 is a top plan view of one embodiment of a mold that may be used to manufacture a screen printing frame with a screen using curable liquid resin in accordance with the present invention.

FIG. 1 illustrates a top plan view of one embodiment of a mold 10 that may be used to manufacture a screen printing frame with a screen in accordance with the invention. In this particular embodiment, the mold 10 is comprised of a body 12 having a channel 14 defined therein for receiving a curable liquid resin. One or more ports 16 may be defined in the body 12 to provide passage for curable liquid resin to be received within the channel 14. In this particular embodiment, the upper surface of the channel 14 is open, thereby providing access for curable liquid resin in the channel 14 to contact a screen when a screen is positioned in proximity to the channel, as shown in FIGS. 3–7 and FIG. 9. Other embodiments of the mold 10, e.g., as shown in FIG. 10, may provide different configurations for providing access for curable liquid resin in the channel 14 to contact a screen that is positioned proximate to the mold.

Figure 2:
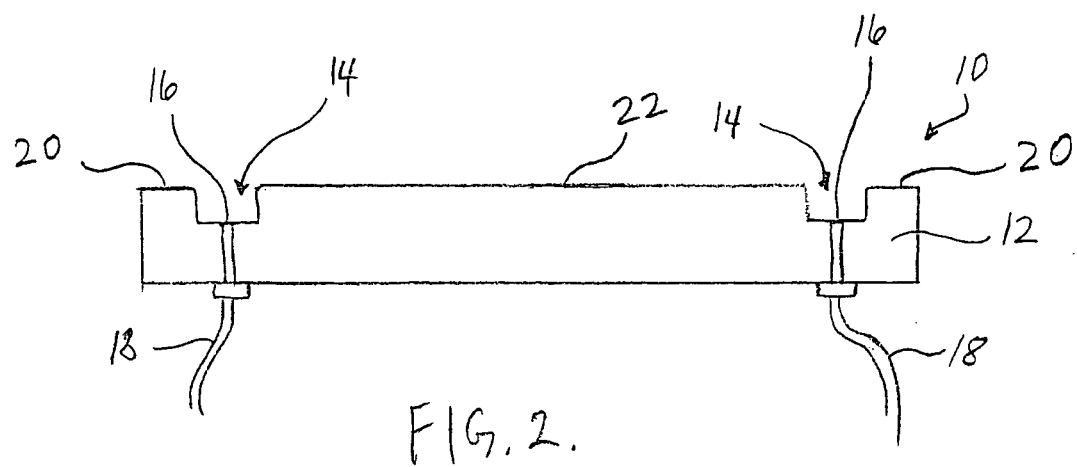
FIG. 2 is a side section view of the mold shown in FIG. 1 along line II—II illustrating injection ports through which curable liquid resin may be received into the mold.

FIG. 2 illustrates a side section view of the mold 10 shown in FIG. 1 along the line II—II. This particular embodiment of the mold 10 employs an injection process to deliver curable liquid resin to the channel 14, though other embodiments may use other ways to cause liquid resin to be received within the channel 14. The curable liquid resin is received within the channel 14 via injection ports 16 and tubes 18. The tubes 18 are suitably connected to a reservoir of curable liquid resin (not shown). In FIG. 2, the channel 16 is defined downward in the upper surface of the body 12 between an outer surface 20 and an inner surface 22. As will be seen from the embodiments described herein, the material forming the screen is positioned proximate to the channel 14 to contact liquid resin received within the channel 14, and may be pressed against the outer and inner surfaces 20, 22, as needed.

Figure 3:
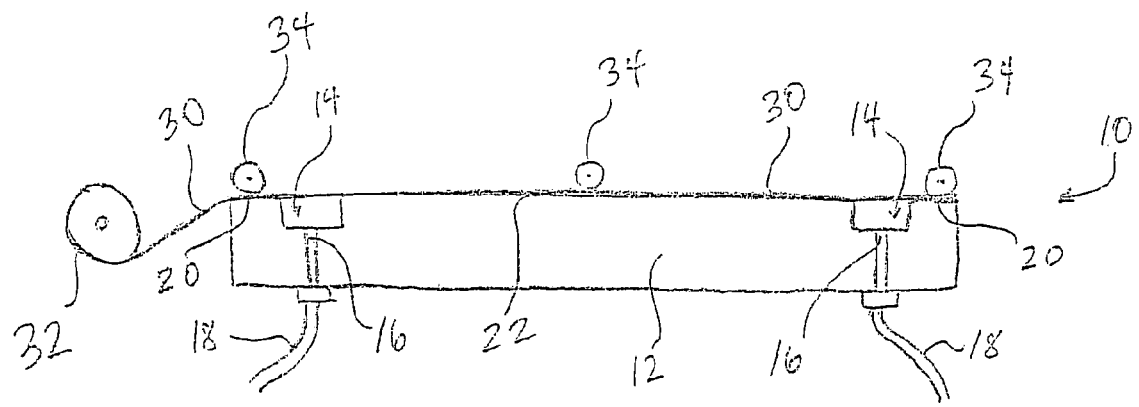
FIG. 3 is a side section view of the mold shown in FIG. 2 with screen material positioned in proximity to the channel in the mold.

Turning now to FIG. 3, a side section view of the mold 10 is illustrated as shown in FIG. 2, with the addition of a screen 30 being rolled and stretched into place on the upper surface of the mold 10. Various mechanisms known in the art may be used to position the screen 30 against the mold 10 at a desired tension. In the particular embodiment shown, rollers 34 are used to position and hold the screen 30 in proximity to the mold 10. Other embodiments may use gripper fingers or other mechanisms, internal or external to the mold 10, to place the screen 30 in proximity to the mold and stretch the screen to a desired tension. The present invention is not limited by the form of mechanism used to draw and tension the screen, nor is it limited by the nature of the screen material itself.

As can be seen in FIG. 3, the screen 30 is positioned on the body 12 of the mold 10 proximate to the channel 14. With an open upper surface of the channel 14 in this embodiment, curable liquid resin received within the channel 14 fills the channel 14 and contacts the screen 30. If desired, curable liquid resin may be injected through the ports 16 into the channel 14 under sufficient pressure to cause the liquid resin in the channel to contact the screen 30. In yet other embodiments, the injection pressure may be sufficient to cause the liquid resin to permeate at least a portion of the screen 30. Permeation of the screen may also occur by natural capillary action, depending on the type of screen material used. Allowing the liquid resin to permeate at least a portion of the screen 30 may help secure the screen to the frame that is being formed in the channel 14 when the liquid resin is cured.

Figure 4:
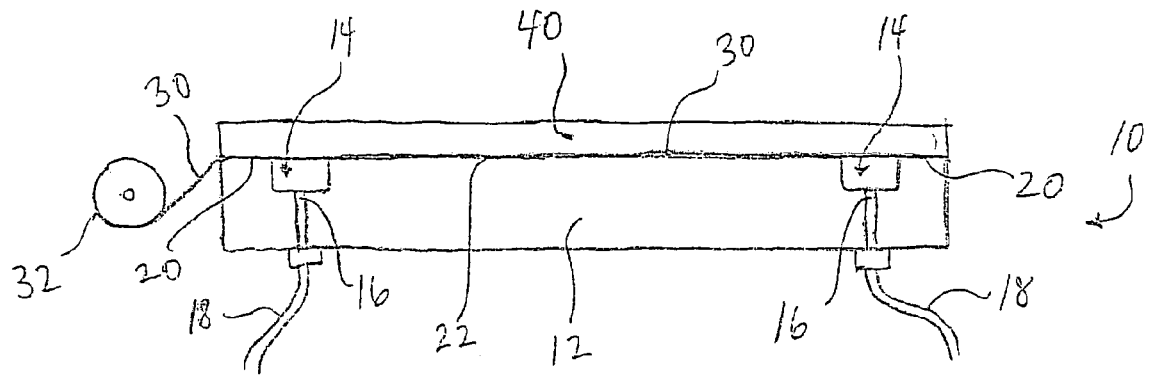
FIG. 4 is a side section view of the mold shown in FIG. 3, further including a substrate placed against the screen material to press it against the mold.

FIG. 4 illustrates a side section view of the mold 10 shown in FIG. 3, with the addition of a substrate 40 positioned against the screen 30 to press the screen against the channel 14 in the mold 10. In this particular embodiment, the substrate 40 is shown constructed of a flat planar material that covers the entire upper surface of the mold 10, as shown in FIG. 1. In other embodiments, the substrate 40 may be constructed more like a frame having sides that cover only the channel 14 when the substrate 40 is positioned against the mold 10.

The screen 30 is held between the substrate 40 and the mold 10. Depending on the configuration of the substrate 40 and the pressure applied to the substrate 40 against the mold 10, the substrate 40 may act to minimize liquid resin flowing outside the channel 14 when liquid resin is received within the channel 14. The substrate 40 may also advantageously provide a uniform planar surface that holds the screen 30 in place proximate to the channel 14 when liquid resin flows into the channel 14.

If needed, the substrate 40 may be configured with recesses that receive the rollers 34 (shown in FIG. 3) when the substrate 40 is placed against the mold 10. In other embodiments, the screen 30 may be stretched and held in place by mechanisms external to the mold 10 and outside the surface area of the substrate 40. The screen 30 is typically held at the desired tension while the substrate 40 is positioned against the mold 10.

Figure 5:
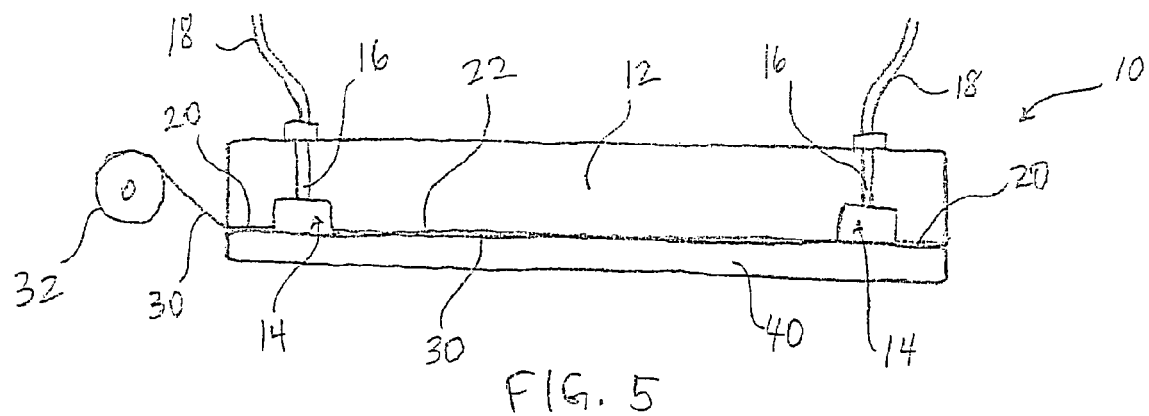
FIG. 5 is a side section view of a mold, screen material, and substrate as shown in FIG. 4, wherein the mold is positioned above the screen and the substrate is positioned below the screen pressing the screen against the mold.

FIG. 5 illustrates an alternative embodiment of the invention configured in a manner similar to the embodiment shown in FIG. 4. In the embodiment of FIG. 5, however, the body 12 of the mold 10 is positioned above the screen 30 such that gravity causes liquid resin in the channel 14 to contact the screen 30 when the resin is received within the channel 14. The substrate 40 is positioned against the other side of the screen 30 opposite the mold 10 and helps hold the screen 30 against the channel 14. The substrate 40 also helps minimize liquid resin outside the channel 14 when liquid resin is received within the channel 14. Depending on the type of fabric or mesh used for the screen 30 and the type of liquid resin received in the channel 14, gravity may further cause the liquid resin to permeate at least a portion of the screen 30.

Figure 6:
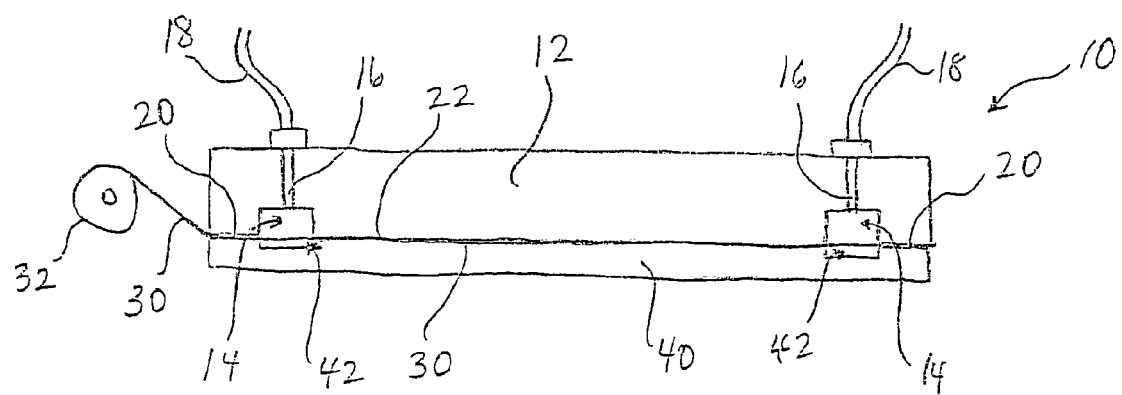
FIG. 6 is a side section view of the mold shown in FIG. 5, with an embodiment of the substrate in which a small channel in the substrate coincides with the channel in the mold.

Yet another alternative embodiment of the invention is in FIG. 6. The embodiment in FIG. 6 is similar to the embodiment shown in FIG. 5, where the mold 10 is positioned above the screen 30 against one side of the screen, and the substrate 40 is positioned below the screen against the other side of the screen. In this embodiment, the substrate 40 further includes a small channel 42 defined therein opposite of the channel 14 in the mold 10. The small channel 42 provides an area into which liquid resin permeating the screen 30 may flow. A configuration as shown in FIG. 6 may further help secure the screen 30 in the frame being formed in the channel 14 when the liquid resin in the channel 14 and channel 42 is cured to a solid state.

Figure 7:
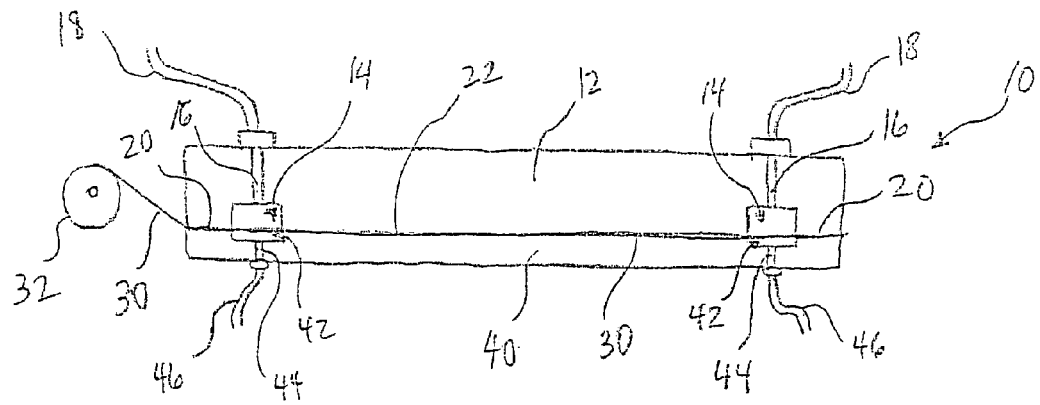
FIG. 7 is a side section view of the mold shown in FIG. 6, with the addition of ports providing access to the small channel in the substrate.

Still another alternative embodiment of the invention is shown in FIG. 7. The embodiment in FIG. 7 is similar to the embodiment shown in FIG. 6, except the substrate 40 further includes access ports 44 and tubing 46 connected to the small channels 42. The ports 44 and tubing 46 may be used to inject liquid resin or draw air or liquid resin away from the small channel 42. As to the latter, a vacuum may be applied to the tubing 46 to draw liquid resin received within the channel 14 into contact with the screen 30. The vacuum may further cause liquid resin in the channel 14 to permeate at least a portion of the screen 30, and perhaps fill the small channel 42 in the substrate 40.

A variety of curable liquid resins may be used to manufacture a screen printing frame according to the invention. Using curable liquid resin is desirable because it is easy to store and deliver to a mold where it contacts a screen, and when the resin is cured to a solid state to form the frame, the solidified resin also secures the screen to the frame.

In typical embodiments, curable liquid resins are made of ingredients that polymerize when subject to a curing agent. For example, some curable liquid resins are known to polymerize in the presence of light. Some resins polymerize in the presence of ultraviolet light, while other resins are configured to polymerize in the presence of visible light. In terms of chemistry, light-curable resins are polymerized by exciting photoreactive ingredients known as photoinitiators under a high intensity light of appropriate frequency. This process may take from a fraction of a second to as long as a few seconds to complete, depending on the configuration, type, and form of the liquid resin to be cured. While many light-curable resins are known in the art, one commercially-available resin that may be used in the invention is manufactured by LESCO of Torrance, Calif. under the product name LESCO LM 219.

Other curable resins are known to polymerize to a solid state in the presence of a source of high energy electrons. Passing an electron beam through the liquid resin excites the photoinitiators in the resin that causes the liquid to polymerize to a solid state. The light-curing and electron beam-curing resins described above can use free radical, cationic or direct electron initiated chemistries. The resins can be combinations of alkyl acrylate and methacrylate monomer and oligimers, for example. As to the latter, the combinations can be acrylated oligimers of polyesters, epoxies, urethanes and silicones. Still other chemistries for curable liquid resins, including chemically-cured resins may be used to manufacture screen printing frames according to the invention. Chemically-cured resins are also widely known in the art. Chemical curing agents may be mixed with the resin either prior to, during, or after the resin received within the channel in the mold.

Figure 8:
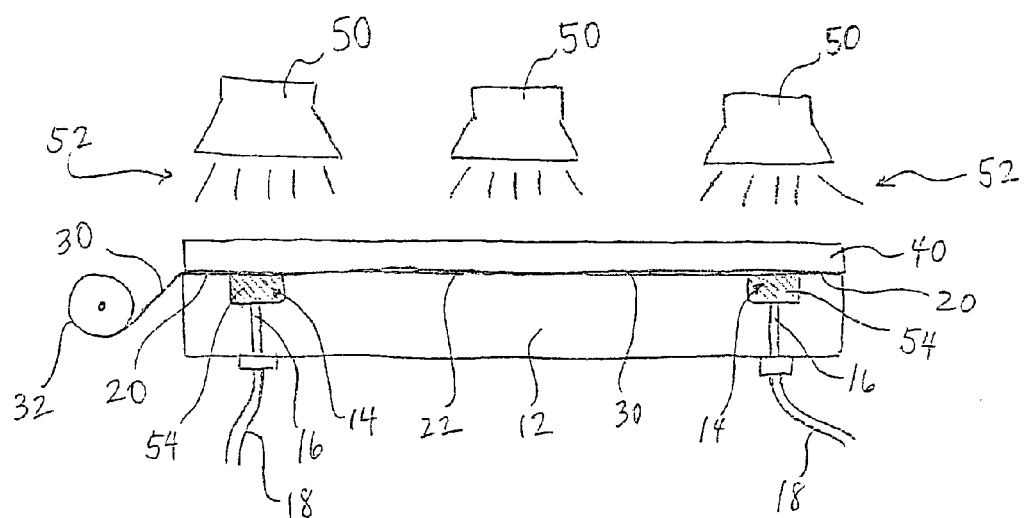
FIG. 8 is a side section view of the mold as shown in FIG. 2 in which a curing agent in the form of light is applied to liquid resin in the mold to cure it to a solid state.

FIG. 8 illustrates an embodiment of the invention shown in FIG. 4 after curable liquid resin has been received within the channel 14. In this particular embodiment, the liquid resin 54 is curable in the presence of light (either ultraviolet or visible light, as desired). For purposes of illustrating the invention, light sources 50 are provided and shown emitting light 52 of a frequency appropriate for curing the liquid resin 54 in the channel 14. As previously noted, the exposure time needed to cure the liquid resin 54 may be as small as a fraction of a second up to several seconds.

While FIG. 8 illustrates three light sources 50, other embodiments of the invention may suitably use a greater or fewer number of light sources. For example, a single light source may be configured to cast light over the entire area of the mold 10, or alternatively may scan across the area of the mold 10. The substrate 40 and the body 12 of the mold 10 are preferably formed of a material through which the light 52 can pass and cure the liquid resin 54 to a solid state. The screen 30 thus embedded in the resin 54 is secured to the frame when the solid resin forming frame is removed from the mold 10.

Figure 9:
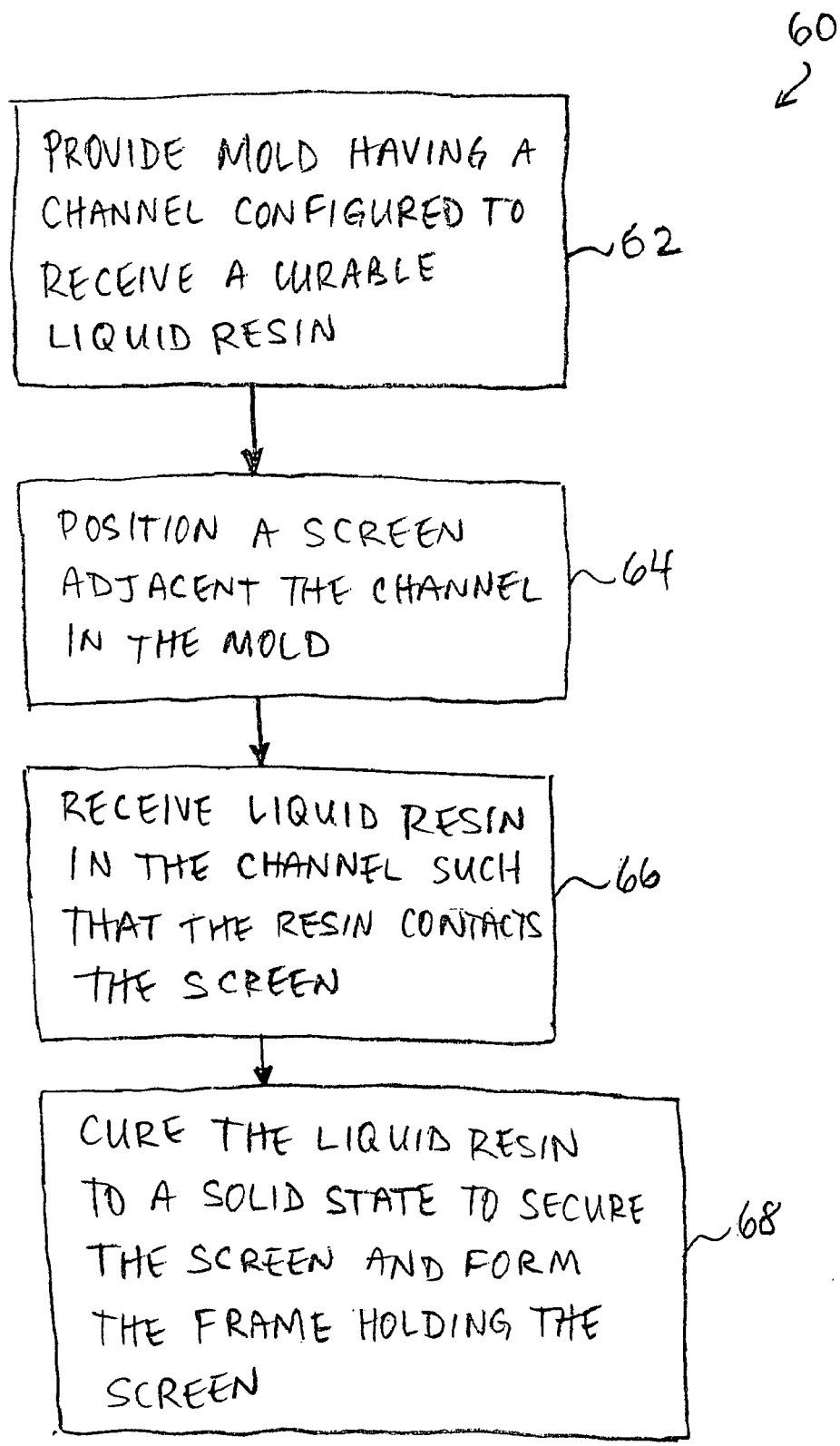
FIG. 9 is a flow diagram of one embodiment of a method that may be used to manufacture a frame holding a screen in accordance with the invention.
Figure 10:
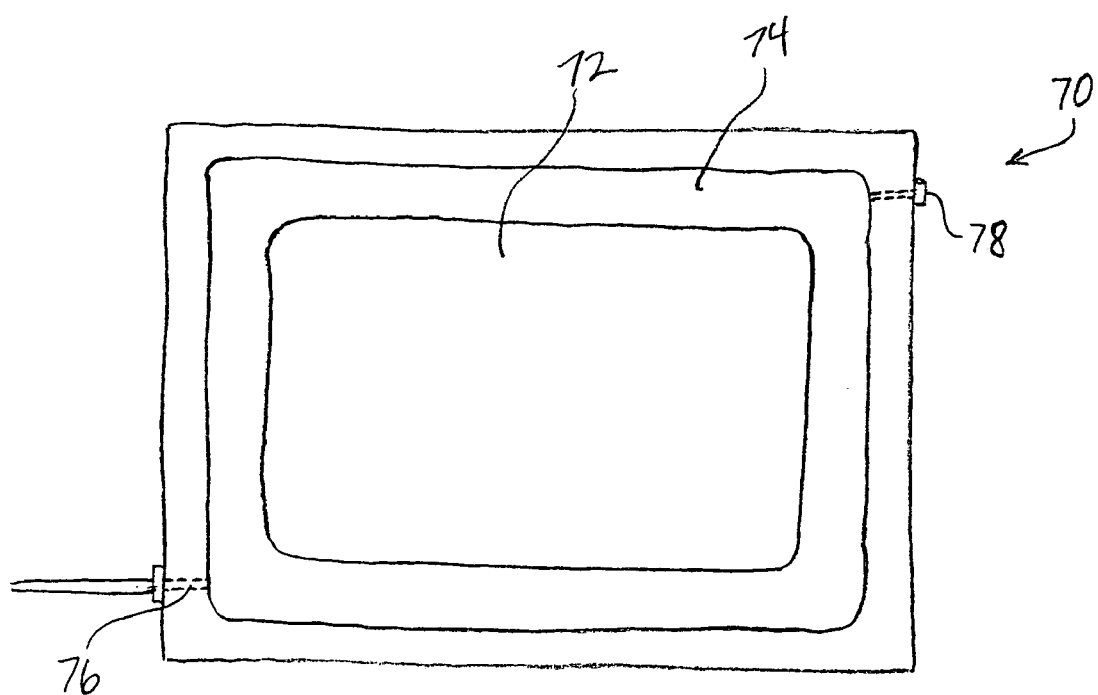
FIG. 10 is a top view of another embodiment of a mold that may be used to manufacture a frame holding a screen in accordance with the invention.

Turning now to FIG. 9, a method 60 is provided by which a frame that holds a screen suitable for screen printing can be manufactured. The method 60 begins at block 62 in which a mold is provided for manufacturing the screen printing frame. As described above, the mold has a channel that is configured to receive a curable liquid resin that, once solidified, forms the screen printing frame.

At block 64, a screen formed of a fabric or mesh material is positioned in proximity to the mold, to the channel defined in the mold. The channel in the mold provides access for curable liquid resin to contact the screen when curable liquid resin is received within the channel.

At block 66, curable liquid resin is received within the channel, such that the resin contacts the screen. In some embodiments, the liquid resin may further permeate at least a portion of the screen. Injection forces and/or gravity may be used to help bring the resin into contact and perhaps permeate a portion of the screen.

Up to this stage in the method 60, the resin received within the channel is in a liquid state. To finally form the screen printing frame with the screen adhered thereto, the liquid resin in the channel is cured to a solid state, as indicated at block 68. When in a solid state, the resin forms the screen printing frame with the screen secured thereto. Thus, the traditional steps of manufacturing a frame and adhering a screen to the frame is accomplished at the same time. The screen printing frame may then be removed from the mold and screen material cut so that the screen printing frame may be coated with emulsion and used in a screen printing process.

To further strengthen the screen printing frame when it is cured, inorganic material, such as glass fiber, carbon fiber, talc, silica, and/or KEVLAR para-aramid fibers may be added to the liquid resin either before, during or after the liquid resin is received within the channel 14. Glass fibers may be continuous, chopped, or milled. Likewise, KEVLAR para-aramid fibers may be chopped or continuous in form.

While prior embodiments of the invention described herein illustrate several ways the invention may be implemented, FIG. 10 illustrates another implementation that may be used to carry out the present invention. In the embodiment shown in FIG. 10, the mold 70 includes a body 72 and a channel 74 in a manner similar to the mold 10 shown in FIG. 1. Unlike the mold 10, the mold 70 includes a single injection port 76 that connects to the channel 74 from the side of the mold 70. The injection port 76 is located in a corner of the channel 74. At an opposite corner of the channel 74, a very small vent 78 penetrating the side of the mold 70 allows air and/or liquid resin to exit the channel 74.

It will be apparent from the above that yet many other variations for construction of a mold that makes a frame holding a screen in accordance with the invention may be obtained using ordinary skill and are encompassed by the present invention. For example, a center portion of the middle of the body 12 (FIG. 1) and 72 (FIG. 10) may be cut out instead of being solid as shown. Moreover, the upper surface of the channel 14 and 74 shown in FIGS. 1 and 10 may be covered and occluded in some portion, provided there remains access for liquid resin in the channels 14, 74 to access a screen placed adjacent to the channels.

Embodiments of the invention are also scalable for higher production of screen printing frames, if desired. For example, one or more molds may be used in an array to produce multiple screen frames all at the same time. Screen material may be stretched over all of the molds in the array, and then cut between the frames when the resin forming the frames is cured. From the foregoing, it should be evident that the scope of the invention is not limited to the precise forms discussed above, but should be determined from the following claims and equivalents thereto.

The invention claimed is:

1. A method of manufacturing a frame that holds a screen suitable for screen printing, comprising:
    (a) providing a mold having a channel that is configured to receive a curable liquid resin for forming a frame;
    (b) positioning a screen in proximity to the channel in the mold;
    (c) receiving curable liquid resin within the channel of the mold such that the resin contacts the screen; and
    (d) curing the liquid resin to a solid state to secure the screen to the resin and form the frame holding the screen,
    wherein the screen is positioned with the mold on one side of the screen, the method further comprising positioning a substrate against the other side of the screen opposite the mold.

2. The method of claim 1, wherein the liquid resin is curable in the presence of ultraviolet light, the method further comprising providing ultraviolet light that cures the liquid resin within the channel to a solid state.

3. The method of claim 1, wherein the liquid resin is curable in the presence of visible light, the method further comprising providing visible light that cures the liquid resin within the channel to a solid state.

4. The method of claim 1, wherein the liquid resin is curable in the presence of an electron beam, the method further comprising providing an electron beam that cures the liquid resin within the channel to a solid state.

5. The method of claim 1, wherein the substrate presses the screen against the channel in the mold.

6. The method of claim 5, wherein the substrate minimizes liquid resin outside the channel in the mold when the liquid resin is received within the channel.

7. The method of claim 1, wherein the mold is positioned above the screen such that gravity causes liquid resin in the channel to contact the screen when the resin is received within the channel in the mold.

8. The method of claim 7, wherein gravity causes the liquid resin to permeate at least a portion of the screen.

9. The method of claim 1, wherein the mold is positioned below the screen and the liquid resin is received within the channel by injection such that injection of the liquid resin causes the resin to contact the screen.

10. The method of claim 9, wherein injection of the liquid resin causes the resin to permeate at least a portion of the screen.

11. The method of claim 1, further comprising applying a vacuum that causes liquid resin that is received within the channel in the mold to contact the screen.

12. The method of claim 11, wherein the vacuum causes the liquid resin to permeate at least a portion of the screen.

13. The method of claim 1, wherein the liquid resin is chemically curable, the method further comprising providing a chemical curing agent to the liquid resin received within the channel to cure the liquid resin to a solid state.

14. The method claim 13, wherein the chemical curing agent is added to the liquid resin when the resin is received within the channel.

15. The method of claim 1, further comprising mixing an inorganic material with the curable liquid resin that is received within the channel in the mold.

16. The method of claim 15, wherein the inorganic material is selected from the group consisting of glass fiber, carbon fiber, talc, silica, and para-aramid fibers.

17. A system for manufacturing a frame that holds a screen suitable for screen printing, comprising:
   a mold having a channel;
   a screen positioned in proximity to the channel in the mold;
   a curable liquid resin; and
   a curing agent,
   wherein the mold is configured to received the curable liquid resin within the channel in a manner that the liquid resin contacts the screen, and
   wherein the curing agent, when applied to the curable liquid resin, cures the resin to a solid state to secure the screen to the resin and form the frame that holds the screen,
   the system further comprising a substrate positioned to hold the screen against the mold and minimize liquid resin outside the channel in the mold when the liquid resin is received within the channel.

18. The system of claim 17, wherein the liquid resin is curable in the presence of light and the curing agent is light.

19. The system of claim 18, wherein the light is ultraviolet light and the curing agent is ultraviolet light.

20. The system of claim 18, wherein the light is visible light and the curing agent is visible light.

21. The system of claim 17, wherein the liquid resin is curable in the presence of an electron beam and the curing agent is an electron beam.

22. The system of claim 17, wherein the mold is constructed of a material that permits light to pass therethrough.

23. The system of claim 17, wherein the substrate is constructed of a material that permits light to pass therethrough.

24. The system of claim 17, wherein the liquid resin is chemically curable and the curing agent is a chemical curing agent.

25. The system of claim 17, wherein the mold is configured to receive the liquid resin within the channel by an injection process.

* * * * *